United States Patent Office 3,117,773
Patented Jan. 14, 1964

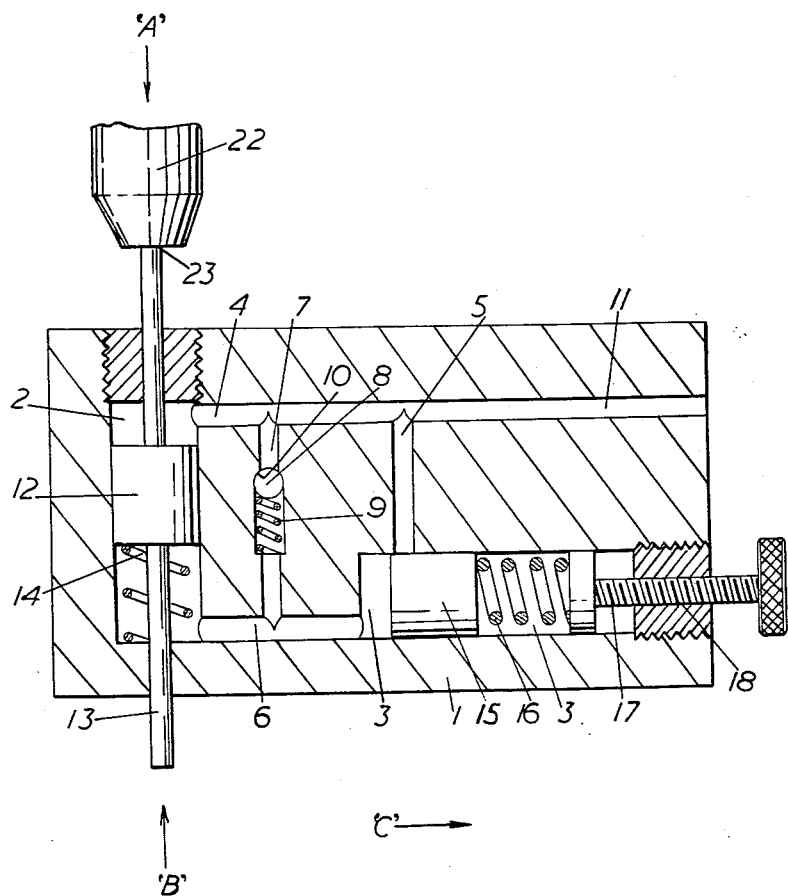

3,117,773
SHOCK ABSORBING DEVICES
Anthony Walter Wallens and Arthur John Compton Soper, Croydon, England, assignors to Creed & Company Limited, Croydon, England, a British company
Filed Aug. 25, 1961, Ser. No. 134,072
Claims priority, application Great Britain Sept. 2, 1960
7 Claims. (Cl. 267—75)

This invention relates to improvements in or relating to shock-absorbing devices particularly but not exclusively for use in type printing telegraph apparatus.

In, for example, type printing telegraph apparatus, it is often necessary to absorb the shock of engagement of a moving mass such as, for example, a type printing head with a stop at the end of a character feed or carriage return operation by retarding the motion of the mass before its final arrest. It is the object of the present invention to provide a shock absorbing device of novel design and principles of operation to meet the foregoing requirements.

According to the present invention therefore there is provided:

A shock absorbing device for retarding arresting the movement of an applied mass including a chest incorporating first and second chambers for containing a hydraulic medium and which said chambers are joined by a plurality of interconnected passages for the flow of hydraulic medium therebetween; a first piston movable in said first chamber, under the influence of an applied moving mass, to effect displacement of hydraulic medium; a second piston movable in said second chamber under the influence of displaced hydraulic medium to control the rate of said flow thereof between said chambers to effect said retardation and arrest of a moving mass; said first and second spring means for opposing said movements of respectively said first and second pistons and for effecting reverse movements thereof on removal of a moving mass applied to said first piston.

Referring now to the accompanying drawing, the figure shows an embodiment of the shock absorbing device in section.

The shock-absorbing device comprises a chest 1 having internal cylindrical chambers or cavities 2 and 3 therein. The ends of cylindrical chamber 2 are joined by interconnected passages 4, 5 and 6 by way of cylindrical chamber 3 and by interconnected passages 4, 7 and 6. Passage 7 incorporates a non-return valve constituted by a ball 8 and compression spring 9 acting on the ball to cause it to engage with seating area 10. An extension 11 of passage 4 is utilised for the supply of a hydraulic medium such as, for example, oil to the passage and cylindrical chambers 2 and 3 from a low pressure feed line (not shown).

Accommodated within the cylindrical chamber 2 there is a first piston 12 which is a sliding fit therein and which piston incorporates longitudinally therethrough a plunger 13, the lower and upper ends of which extend through the chest 1. A compression spring 14 is also accommodated in cylindrical chamber 2 and extends between an end face of piston 12 and the bottom end of the cylindrical chamber. Cavity 2 is thus divided into a first chamber above piston 12 which connects with passage 4 and a second chamber below piston 12 which connects with passage 6. It is the purpose of the compression spring 14 to urge the piston 12 and plunger 13 thereof upward in the direction indicated by the arrow "B" to a rest position as shown. Accommodated within the cylindrical chamber 3 there is a second piston 15 which is a sliding fit therein. A compression spring 16 is also accommodated in cylindrical chamber 3 and extends between the right hand end face of the second piston 15 and the flanged end of an adjusting screw 17 by which means the compression spring 16 may be pre-loaded so that the opposing force of this compression spring is at the most equal to the force of the moving mass acting on piston 13 by way of hydraulic medium, displaced by piston 12 in its movement under the influence of the applied mass. Thus cavity 3 is divided into a first chamber connected to passages 5 and 6 and a second chamber containing spring 16 and which is devoid of hydraulic medium.

The accompanying drawing shows the dispositions of the dynamic components of the device at the commencement of retardation and arrest of the moving mass 22. In their rest conditions, pistons 12 and 15 are in a position such that the upper end of piston 12 is clear of the entrance to passage 4 and the left hand end of piston 15 obscures the entrance to cylindrical chamber 3 from passage 5.

In operation, the mass 22, which may be for example part of a type-printing head, moves in the direction indicated by the arrow "A" to engage the upper end of plunger 13. In consequence piston 12 is moved under the influence of plunger 13 in the same direction against the influence of compression spring 14. Hydraulic medium is caused to flow from the lower end of cylindrical chamber 2 into the left hand end of cylindrical chamber 3, and hydraulic medium is drawn from the low pressure feed line (not shown) via extension 11 of passage 4. The pressure of the hydraulic medium acting on the left hand end of piston 15 causes the piston to move in the direction indicated by the arrow "C" against the influence of pre-loaded compression spring 16. During the movement of piston 15. The entrance of passage 5 is progressively exposed to the hydraulic medium flowing from the lower end of cylindrical chamber 2 which medium is then allowed to flow back into the upper end of cylindrical chamber 2 by way of passage 4, the pre-loading of spring 9 of the ball valve is such that the pressure of medium flowing back is insufficient to cause the valve to open via passage 4 and the upper portion of passage 7.

It will readily be understood that the rate of retardation and arrest of the moving mass will be dependent on the pre-loading applied to compression spring 16. The retarding action of piston 12 will be independent of the velocity of the moving mass and viscosity of the hydraulic medium, and variation in retardation force is a function of the rate of compression spring 16 according to the pre-loading applied thereto.

When the force acting on piston 12 via the plunger portion 13 thereof is removed by movement of the mass 22 in a direction indicated by the arrow "B," the piston 12 and the plunger portion 13 thereof are returned to their non-operating condition under the influence of compression spring 14, likewise piston 15 is returned to its non-operating position by compression spring 16. The entrance to passage 5 from cylindrical chambers is progressively obscured by the movement of piston 15 and hydraulic medium is then returned from the upper end of cylindrical chamber 2 to the lower end thereof through passages 4 and 6 by way of the passage 7 and the valve included therein constituted by the ball 8 and compression spring 9. The pre-loading of compression spring 9 is such that the pressure of the hydraulic medium in its return is sufficient to overcome the force which the spring 9 exerts on the ball 8.

It is to be understood that the foregoing description of specific examples of this invention is not to be considered as a limitation of its scope.

What we claim is:

1. A hydraulic shock absorbing device for retarding and arresting the movement of an applied mass comprising:
   a. first and second cavities;

b. first and second pistons;
c. first means for resiliently mounting said first piston in said first cavity whereby said first cavity is separated into first and second chambers containing hydraulic medium therein which opposes movement of said first piston;
d. second means for resiliently mounting said second piston in said second cavity whereby said cavity is separated into a third chamber containing hydraulic medium and a fourth chamber containing said resilient mounting means;
e. means for transmitting the applied force to said first piston;
f. means for adjustably controlling the equilibrium position of said second piston;
g. and means hydraulically connecting said first, second, and third chambers for transmitting motion of said first piston to said second piston and for controlling the retarding and arresting force of said first piston by the position of said second piston.

2. A device as claimed in claim 1 further comprising a source of hydraulic medium connected to said first chamber.

3. A device according to claim 2 wherein said cavities are cylindrical.

4. A device according to claim 3 wherein said first and second mounting means comprise first and second springs, respectively.

5. A device as claimed in claim 4 wherein said means for positioning said second piston comprises means for preloading said second spring.

6. A device according to claim 5 wherein said connecting means comprises a plurality of passages and said second chamber controls the retarding and arresting force of said first piston by controlling the opening of one of said plurality of passages.

7. A device according to claim 6 wherein said transmitting means comprises a rod.

References Cited in the file of this patent
UNITED STATES PATENTS

| | | |
|---|---|---|
| 1,880,234 | Bullock et al. | Oct. 4, 1932 |
| 2,778,259 | Moir | Jan. 22, 1957 |
| 2,842,357 | Williamson | July 8, 1958 |
| 2,907,562 | Van Ryan et al. | Oct. 6, 1959 |

FOREIGN PATENTS

| | | |
|---|---|---|
| 1,216,651 | France | Nov. 30, 1959 |